United States Patent [19]

Bindon

[11] 4,363,713

[45] Dec. 14, 1982

[54] ELECTROLYTIC HALOGEN GENERATORS

[75] Inventor: Jeffery P. Bindon, Durban, South Africa

[73] Assignee: Roecar Holdings (Netherlands Antilles), Amsterdam, Netherlands

[21] Appl. No.: 226,512

[22] Filed: Jan. 19, 1981

[30] Foreign Application Priority Data

Jan. 17, 1980 [ZA] South Africa ............... 80/0285

[51] Int. Cl.³ .................... C25B 9/00; C25B 1/26
[52] U.S. Cl. .................................. 204/278; 204/128
[58] Field of Search ............... 204/128, 258, 266, 271, 204/278

[56] References Cited

U.S. PATENT DOCUMENTS

| 491,700 | 2/1893 | Cuttenp | 204/266 X |
| 807,640 | 12/1905 | Roberts | 204/266 X |
| 4,097,356 | 6/1978 | Yates | 204/266 X |
| 4,248,715 | 2/1981 | Olivier | 204/266 X |
| 4,260,468 | 4/1981 | Bradley | 204/266 X |
| 4,290,873 | 9/1981 | Weaver | 204/271 X |

FOREIGN PATENT DOCUMENTS 365344 12/1962 Switzerland ............... 204/266

Primary Examiner—Donald R. Valentine

[57] ABSTRACT

A chlorine generator (1) includes an electrolytic cell (2) and a transformer/rectifier unit (4). The electrolytic cell (2) has an anode (6) provided with a hood (7) and a cathode (8) located near the top of the cell (2). A conduct (11) connected to the top of the anode hood (7) has an outlet to the water (5) surrounding the cell (2). A saline anolyte (24) is provided near the anode (6) and a dilute saline catholyte (25) is joined in the region of the cathode (8). When the power supply is switched on gas (27) and caustic soda are formed at the cathode (8). Gas (28) consisting of chlorine and traces of oxygen is formed on the anode (6) by electrolysis.

5 Claims, 7 Drawing Figures

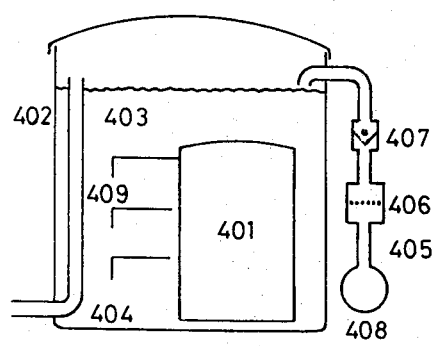
FIG. 4.
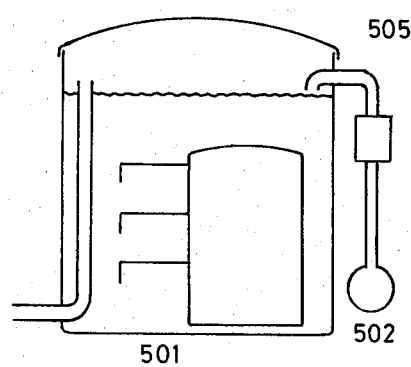
FIG. 5.
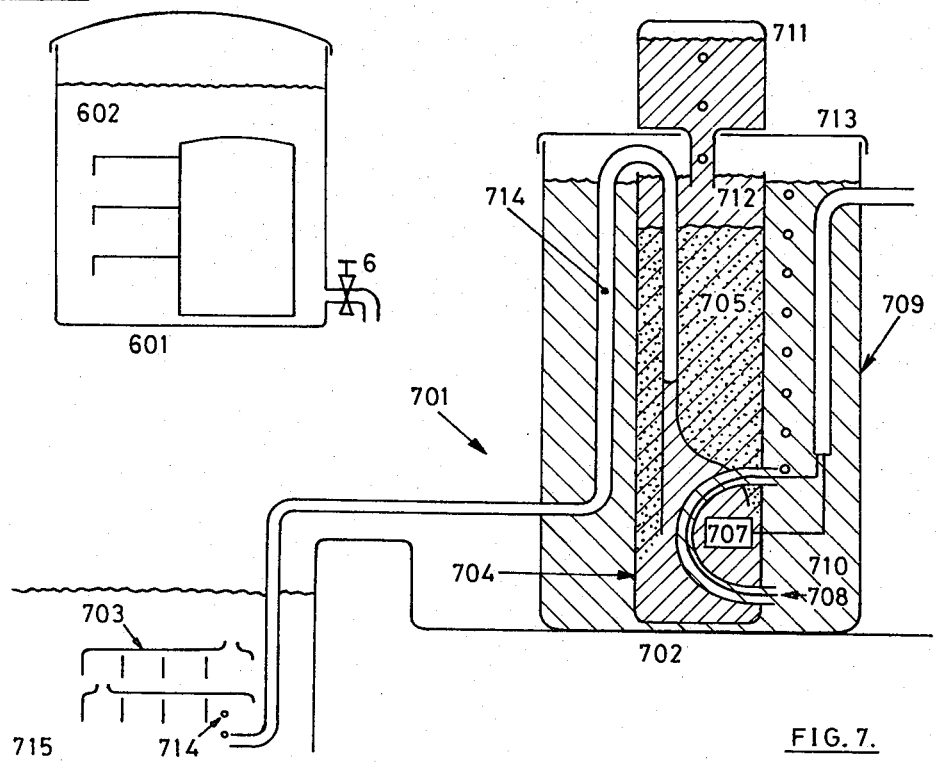
FIG. 6.
FIG. 7.

ELECTROLYTIC HALOGEN GENERATORS

The invention described herein relates to the electrolytic generation of halogens from halides and in particular to the generation of chlorine from sodium chloride, for the purpose of disinfecting swimming pools.

Industrial chlorine is generated from sodium chloride in electrolytic cells but this method has found limited application to swimming pools because of the cost and complexity of operation of electrolytic cells.

It is an object of the invention to provide a novel arrangement of the major electrolytic cell components to render the electrolytic cell suitable for swimming poll disinfection.

The electrolytic cell is different from industrial cells because of the very different criteria to be met. Industrial cells must produce high quality caustic soda as well as chlorine; must have the lowest possible supply voltage for economy and operate on continuous flows of electrolyte. A cell for pool use need produce only chlorine, the caustic soda may go to waste or it may be generated in a very dilute form. The cell voltage can be much higher and a batch process must be used as the complexity of a continuous electrolyte feed arrangement is expensive.

The design of a batch process electrolytic cell involves preventing the caustic soda from moving from the cathode, where it is formed, to the anode where it forms oxygen instead of the desired chlorine. A secondary criterion for a batch unit suitable for unskilled operation is that the periodic recharging process should not produce traces of chlorine gase which can be dangerous.

A problem which has continually beset the use of chlorine generators in swimming pools is the means of dissolving the gas into water. All known units operate only when the water circulation system is used to dissolve the chlorine. It is a further object of the invention to provide a generator that operates continuously and independent to the pump and which can be used even on pools without a circulation pump.

According to the invention apparatus for the electrolytic generation of a halogen from a halide comprises a cell containing an anode and a cathode in an electrolyte, the cell being adapted to accommodate the solid halide in a mass between the anode and the cathode separating the catholyte from the anolyte, means being provided to collect the halogen formed at the anode during electrolysis and to isolate it from the mass of halide; and a conduit arranged to convey the collected halogen to a location outside the cell.

The cathode should preferably be a distance away from, or above, the mass of halide to assist in the formation of a dense, stagnant layer of electrolyte between the halide and the cathode thereby enhancing the separation of the anolyte and catholyte.

In the preferred form of the invention the collection means for the halogen formed at the anode comprises a hood located above the anode, the conduit rising from a high point in the hood and having an inverted U-shape, the exit thereof being lower than the apex of the "U". The hood prevents the halogen from bubbling up through the mass of halide and the stagnant layer of electrolyte thereabove disturbing its separating function. In this manner the tendency of the halide bed to dissolve into the dilute electrolyte above the cathode is also prevented, and furthermore the halogen is prevented from reaching and reacting with the catholyte, which process causes the reformation of anions within the cell and hence a reduction of the net emission of the required halogen from the cell.

The inverted U-tube allows the emission of the halogen from the cell, while preventing the passage of electrolyte.

The apparatus is preferably adapted for submersion in a liquid, the apparatus including, outside the cell and above the exit of the conduit, an inverted, dish-shaped collector adapted to receive the gaseous halogen and waste gas conveyed from the anode. A plurality of stacked collectors may conveniently be provided, each adapted to receive the gaseous halogen and waste gas from the collector below, each being provided with at least one aperture therein through which the gas may be allowed to pass to the collector thereabove and through which, from the upper collector, undissolved halogen and waste gas formed at the anode may be discharged into the liquid within which the cell is submerged.

The cell wall may conveniently be formed with an orifice above the cathode through which the gas formed at the cathode may be expelled from the cell along with the product formed at the cathode. The apparatus is preferably adapted for use in swimming pools and the halide therein may therefore be granular sodium chloride. The invention will therefore be described with reference to such a chlorine generator, but it will be appreciated, that this description is merely by way of an example.

The invention is further described with reference to the accompanying drawings in which:

FIG. 4 is a diagrammatic sectional side elevation of a generator according to the invention, located within a separate container, fed from the pool circulating system;

FIG. 5 shows a similar container fed from water mains;

FIG. 6 shows a similar container fed manually; and

FIG. 7 shows a chlorine generator incorporating an ion selective membrane feeding chlorine to a separate submersible chlorine dissolver.

Figure 1:
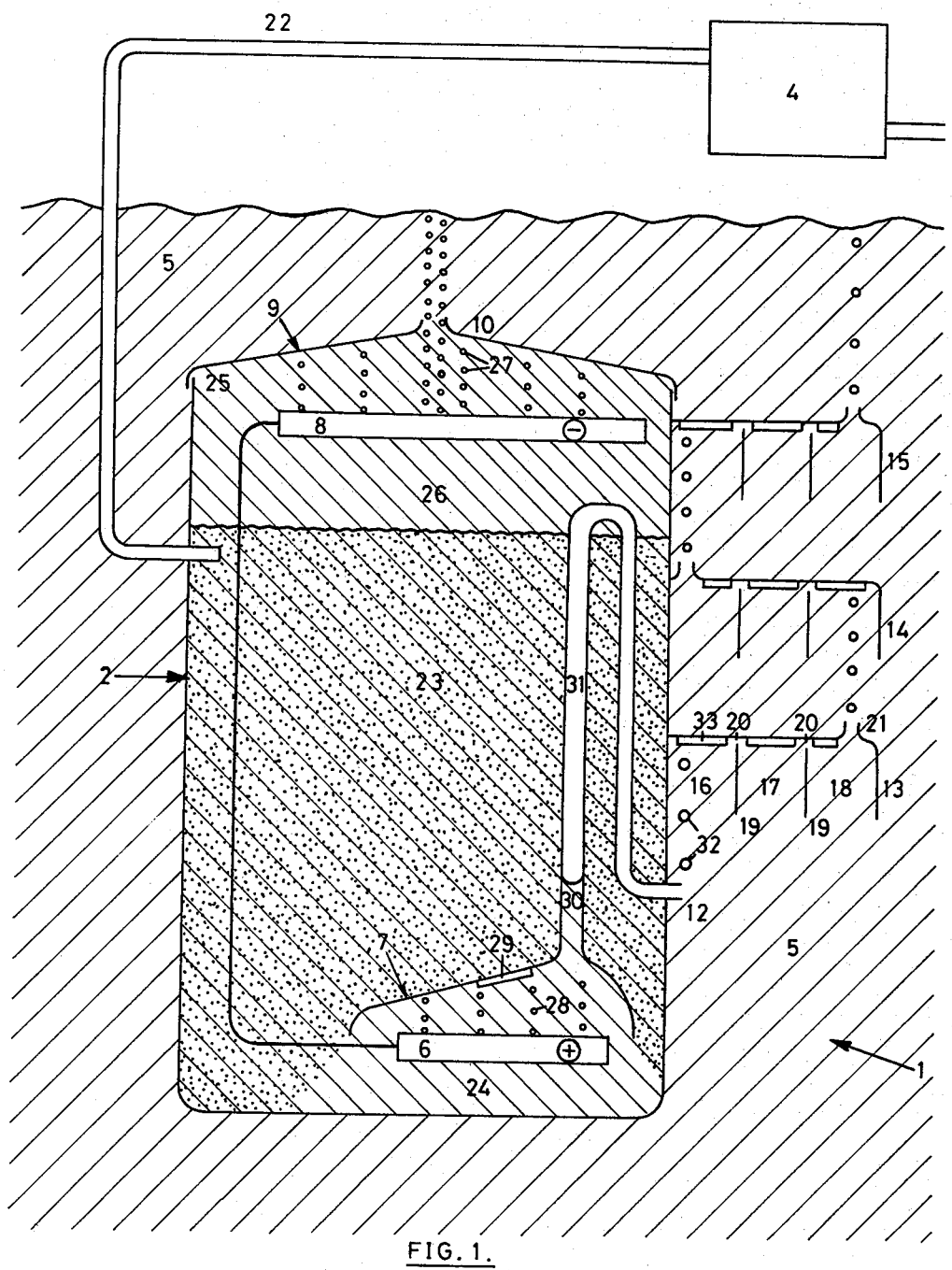
FIG. 1 is a diagrammatic sectional side elevation of a chlorine generator submerged in a liquid.

In FIG. 1 a chlorine generator 1 is shown submerged beneath the surface of a swimming pool, the generator comprising two major components; an electrolytic cell 2 and a transformer/rectifier unit (indicated generally by a box 4). The electrolytic cell 2 has an anode 6 located near the base of the cell and an anode hood 7 is provided thereover. A cathode 8 is located near the top of the cell 2, which is closed by means of a lid 9 in which an aperture 10 is formed. An inverted U-shaped conduit 11 leads from the top of the anode hood 7 to the water 5 surrounding the cell 2. A stack of dissolvers 13,14,15 are located on the outside of the cell, the lower faces of the dissolvers being divided into a number of compartments 16, 17, 18, by partitions 19 which are provided with holes near their point of attachment to the under surface of the dissolvers. A cable 22 provides power to the anode and the cathode.

Prior to the location of the cell in the water, the lid 9 thereof is removed and a bed of granular table salt 23 is fed in to a level just below the cathode 8. Water is then poured in completely to fill the cell 2, forming a saline anolyte 24 near the anode 6 and a dilute saline catholyte 25, 26 in the region of the cathode. The lid 9 is replaced and the cell is lowered into the water 5, any trapped air escaping through the hole 10 in the lid. The power supply 4 is then switched on.

At the cathode 8 hydrogen gas 27 and caustic soda are formed, the hydrogen bubbles rising vigourously upwards and mixing and diluting the caustic soda into the catholyte 25 above the cathode 8. The action of the bubbles 27 divides the catholyte 25, 26 into distinct regions, a dense stagnant layer 26 between the cathode 8 and the salt bed 23 and a dilute turbulent layer 25 between the cathode and the lid 9, the bubbles 27 sweeping some of the catholyte 25 out of the hole 10 and drawing in some fresh water 5 to replace that removed. It will be appreciated that the removal of the caustic soda from the cell reduces the amount which can migrate downwards towards the anode 6 where it would cause oxygen to be formed instead of chlorine. In addition, the caustic soda removed from the cell mixes into the water 5 and counteracts the acidifying action of the chlorine. If desired, the resistance of the cell can be changed by altering the size of the hole 10 in the lid 9, thereby varying the amounts of chlorine produced without the complications of a controllable power supply.

The downward migration of the caustic catholyte 25 towards the anode 6 by mixing or convection is completely eliminated by the stagnant layer of catholyte 26 between the cathode 8 and the salt bed 23, by the stagnant electrolyte within the salt bed 23 and by the physical distance of the cathode 8 from the anode 6. The catholyte 26 is stagnant because the liquid layers in contact with the salt bed 23 are heavier than the light liquid in contact with the dilute catholyte 25. It is the applicant's experience that the degree of stagnancy is such as to cause no salt from the salt bed to dissolve into the dilute catholyte 25 despite the turbulence caused by the action of the hydrogen bubbles 27.

Gas 28, consisting of chlorine and traces of oxygen, is formed on the anode 6 by electrolysis and rises upwards, accumulating in bubbles 29 beneath the anode hood 7. The anode hood 7 therefore allows the flow of electric current to anode 6 but prevents the gas 28 from bubbling up through the salt bed. In this manner the dangerous contamination of the salt bed and the electrolyte with chlorine is prevented as well as the dissolution of the salt bed 23 into the dilute electrolyte 25 and hence into the water 5 via the hole 10. It also prevents the mixing of the caustic catholyte 25, 26 with the anolyte 24.

The accumulated gas under the anode hood 7 moves, via the "U-tube", to the water and, in negotiating the "U-tube", the back pressure of the escaping gas prevents the passage of anolyte 24 into the water 5. The escaping gas 32 is caught beneath the first dissolver 13, forming a large flat bubble 33. Some chlorine will dissolve into the water and the remaining gas, now partially depleted of chlorine, will pass through the connecting hole 20 in the partition 19 to enter the second compartment 17. Chlorine will continue to dissolve as the gas passes from compartment to compartment until it reaches the last compartment 18 from whence it passes via the hole 21 to the next dissolver 14 where the process is repeated. From there it passes to the upper dissolver 15 and from here the gas, amost totally devoid of chlorine is expelled into the water.

When between 1 and 5 weeks have elapsed, depending on the current supplied by the power supply 4, the salt bed 23 is partially consumed from below. The anolyte 24 is now in close proximity to the dense caustic catholyte 26 and should the process be allowed to continue, the anolyte 24 will become caustic and oxygen instead of chlorine will be formed at the anode 6. The cell 2 is therefore lifted out of the water and the liquid is drained therefrom, retaining the remaining salt. It is then topped up with fresh salt and water.

Figure 2:
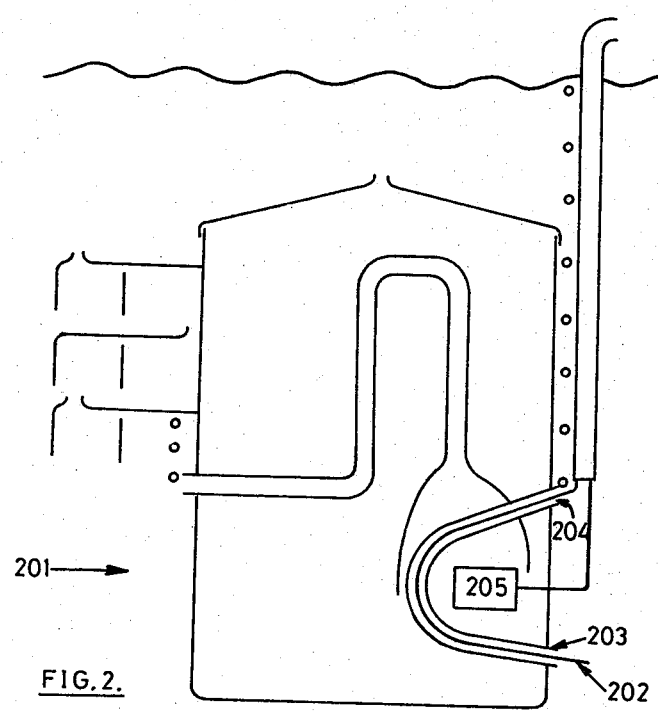
FIG. 2 is a diagrammatic sectional side elevation of a chlorine generator incorporating an ion selective membrane.
Figure 3:
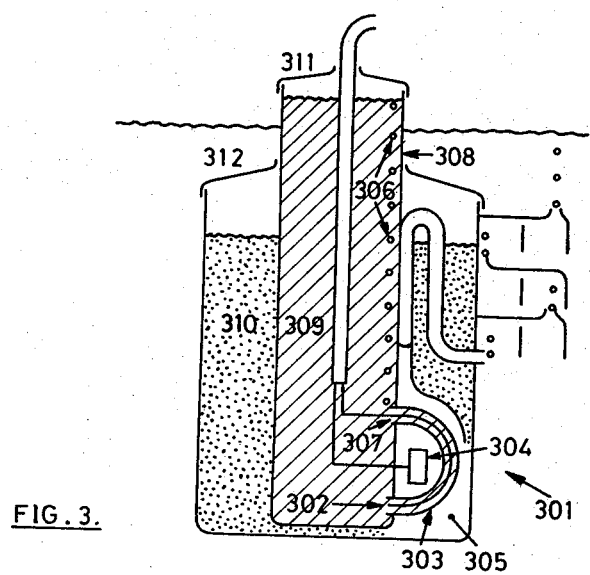
FIG. 3 is a similar drawing of a chlorine generator incorporating an ion selective membrane in addition to an internal catholyte reservoir.

The chlorine generators shown in FIGS. 2, 3 and 7 are modifications of the basic generator proposed and operate on principles similar to those described above. Only the aspects in which they differ from the basic generator will therefore be described.

In FIG. 2 a submersible chlorine generator 201 is shown which incorporates a special ion selective membrane tube 203 such as NAFION (Trade Mark) made by du Pont de Nemours. The cathode 202 is located within the tube 203, the membrane of which restricts the flow of hydroxyl towards the anode 205. The sodium ions pass easily through the membrane to form caustic soda and hydrogen on the cathode and these emerge from the tube outlet 204 where the hydrogen bubbles to the surface of the water around the cell while the caustic soda mixes with the water. The chlorine formed on the anode 205 is once again expelled from the cell via a "U-tube".

The chlorine generator 301 shown in FIG. 3 incorporates an ion selective membrane tube 303 which surrounds the cathode 302 and which incorporates a special reservoir 308 containing the caustic catholyte 309. Hydrogen gas 306 and caustic soda 309 are discharged from the top end 307 of the membrane tube 303 causing a continuous circulation of catholyte 309 through the membrane tube. The catholyte 309 and the salt bed 310 may be replaced periodically through the lids 311 and 312 respectively.

FIGS. 4, 5 and 6 provide an alternative arrangement for the submersible generators to operate in separate containers rather than immersed directly in the swimming pool water. In each case means is provided to transmit the chlorinated water formed in the container to the swimming pool.

FIG. 4 shows a submersible chlorine generator 401, as described above with reference to FIGS. 1, 2 or 3, located in a container 402 of water 403 in which the chlorine discharged to the dissolvers 409 is absorbed. This water, which becomes rich in dissolved chlorine, is periodically discharged to the pool via an overflow pipe 404 when fresh water is fed in via the tube 405. A filter 406 and a non-return valve 407 are interposed between the outlet of the tube 405 and the pressure line 408 of the pool circulating system. The water 403 is replenished every time the pool circulation system operates, which is normally 3 times a day.

FIG. 5 shows a container 501 similar to that of the container 402 in FIG. 4, differing only in the provision of a fresh water supply obtained from water mains 502. The water supply is controlled by a flow limiting means 503, such as, for instance, small orifice.

FIG. 6 shows an extremely simple container 601 which needs to be replenished by hand. The chlorine rich water 602 therein is discharged, also manually, by means of a tap 603.

The generator 701 shown in FIG. 7, incorporates an ion selective membrane 702 and the chlorine gas 714 obtained therefrom is fed to a separate submersible dissolver unit 703. The dissolver 703 operates on the same principles as described hereabove and may be placed in the swimming pool 715 or in a separate container. The generator 701 is provided with an inner container 704 which houses the salt bed 705 and the anode 707. The container 704 is housed within an outer container 709 holding the catholyte 710 which intrudes into the inner container 704 by means of the membrane tube 702. The cathode 708, while it is effectively located within the inner container 704, is in fact separated therefrom by the membrane tube 702. The level of the liquid 712 in the inner container 704, is maintained constant by means of a water reservoir 711. The salt bed 705 and the catholyte 710 are periodically replenished via the lid 713.

It is the present applicant's experience that the proposed chlorine generator, by leading the chlorine away from the salt bed and the stagnant electrolyte beneath the cathode, does away with the danger associated with prior art devices in which traces of chlorine in the salt bed pose a very real threat during the refilling of the cell. In addition the mixing of the hydrogen gas and the chlorine to form a potentially explosive mixture, is prevented in the generator of the invention.

I claim:

1. Apparatus for the electrolytic generation of a halogen from a solid halide, comprising: an anode and a cathode in a single compartment which is adapted to accommodate the halide in a bed of a predetermined depth, the anode being located at the bottom of the halide bed and disturbance, in use, of the halide bed by the gaseous halogen formed on the anode surface being prevented by the provision, above the anode, of a collector for the halide and a conduit arranged to convey the collected halogen from the compartment, the formation, in use, of a stagnant layer of catholyte-rich liquid between the cathode and the halide bed being promoted by the location of the cathode a predetermined distance above the halide bed level, the distance being sufficient for the turbulence created by the gaseous product formed on the surface of the cathode to occur above the stagnant layer, a vent being provided above the cathode to exhaust the gaseous product, and the compartment being open to a source of fresh water above the halide bed level for the dissolution, into the fresh water of the catholyte.

2. Apparatus for the electrolytic generation of a halogen from a solid halide according to claim 1, which is adapted for submersion in a liquid and in which the collector for the halogen formed at the anode comprises a hood located directly above the anode, the conduit arising from a high point in the hood, having an inverted U-shape and terminating at a point outside the compartment, the termination thereof being lower than the apex of the U.

3. Apparatus according to claim 1, which is adapted for submersion in a liquid, the apparatus including, outside the compartment and above the exit of the conduit from the compartment, a plurality of stacked, inverted dish shaped collectors, submersible in the liquid and adapted to receive the gaseous halogen and waste gas conveyed from the anode, each provided with at least one aperture therein through which the collected gas may be allowed to pass to the collector thereabove and through which, from the upper collector, undissolved halogen gas and waste gas formed at the anode may be discharged into the liquid within which the cell is submerged.

4. Apparatus for the electrolytic generation of a halogen from a solid halide according to claim 1, which is adapted for submersion in a liquid and in which the collector for the halogen formed at the anode comprises a hood located directly above the anode, the conduit arising from a high point in the hood, having an inverted U-shape and terminating at a point outside the compartment, the termination thereof being lower than the apex of the U and the apparatus including outside the compartment and above the exit of the conduit from the compartment, a plurality of stacked, inverted dish shaped collectors adapted to receive the gaseous halogen and waste gas conveyed from the anode, each provided with at least one aperture therein through which the collected gas may be allowed to pass to the collector there above and through which, from the upper collector, undissolved halogen gas and waste gas formed at the anode may be discharged into the liquid within which the cell is submerged.

5. Apparatus for the electrolytic generation of a halogen from a solid halide, comprising: an anode and a cathode in a compartment, a collector for the halide formed at the anode, and a conduit arranged to convey the collected halogen from the compartment, the apparatus being adapted for submersion in a liquid, and including, outside the compartment and above the exit of the conduit from the compartment, a plurality of stacked, inverted dish shaped collectors submersible in the liquid and adapted to receive the gaseous halogen and waste gas conveyed from the anode, each provided with at least one aperture therein through which the collected gas may be allowed to pass to the collector thereabove and through which, from the upper collector, undissolved halogen gas and waste gas formed at the anode may be discharged into the liquid within which the cell is submerged.

* * * * *